(12) United States Patent
Petruzzelli

(10) Patent No.: US 8,132,214 B2
(45) Date of Patent: Mar. 6, 2012

(54) LOW NOISE BLOCK CONVERTER FEEDHORN

(75) Inventor: Edmund F. Petruzzelli, Centennial, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 859 days.

(21) Appl. No.: 12/062,254

(22) Filed: Apr. 3, 2008

(65) Prior Publication Data

US 2009/0254955 A1     Oct. 8, 2009

(51) Int. Cl.
*H04N 7/173* (2011.01)
*H04N 5/445* (2011.01)
*H04N 5/50* (2006.01)
*G06F 13/00* (2006.01)

(52) U.S. Cl. ............... 725/68; 725/63; 725/69; 725/70; 455/3.01; 455/189.1; 455/314; 313/47

(58) Field of Classification Search .................... 725/68, 725/69, 63, 70; 455/3.01, 3.02, 100, 314, 455/189.1, 315; 331/47
See application file for complete search history.

(56) References Cited

U.S. PATENT DOCUMENTS

2001/0015995 A1 *   8/2001   Emery et al. ................... 375/130
* cited by examiner

*Primary Examiner* — Pankaj Kumar
*Assistant Examiner* — Reuben Brown
(74) *Attorney, Agent, or Firm* — Dorsey & Whitney LLP

(57) ABSTRACT

A circuit, electrical device or other apparatus for band stacking and/or band translating multiple transmissions. Such transmissions may be satellite transmissions, terrestrial transmissions, signals carried across a wired network such as a cable network, and so forth. Two sets of left-hand polarized and right-hand polarized signals may be accepted by an embodiment. One left-hand polarized signal and one right-hand polarized signal may be band stacked such that the left-hand polarized signal occupies a first frequency and the right-hand polarized signal occupies a second frequency, thereby permitting the two signals to be transmitted simultaneously across a single transmission line as a first unique signal. The second left-hand polarized signal and second right-hand polarized signal may likewise be combined into a second unique signal for transmission. The first and second unique signals may be stacked as a first stacked output and a second stacked output by a band translating circuit.

15 Claims, 9 Drawing Sheets

LOW NOISE BLOCK CONVERTER FEEDHORN

TECHNICAL FIELD

Embodiments of the present invention relate generally to low noise block converter feedhorns for use in a satellite broadcast/reception system, and more particularly to a band-translating low noise block converter feedhorn having a single local oscillator.

CROSS-REFERENCE TO RELATED APPLICATIONS

This application incorporates the following applications by reference as if fully set forth herein: U.S. patent application Ser. No. 11/256,472, filed Oct. 20, 2005; and U.S. patent application Ser. No. 11/140,330, filed May 27, 2005, both naming Edmund F. Petruzzelli as inventor.

BACKGROUND

Modern tuning devices, such as those used in set top boxes to receive satellite transmissions, often have multiple tuners. The use of multiple tuners permits a set top box to perform several functions that would otherwise be difficult or impossible. For example, a multi-tuner set top box may display a picture-in-picture output or may record one program while another is sent from the set top box for display on a display device.

Multi-tuner set top boxes typically employ band stacking and translation to process multiple signals originating from multiple sources, such as two or more satellite transmitters. Briefly, band stacking is the process of placing two discrete signal bands on a single cable. The discrete signals occupy different frequencies of the input and are often separated by a guard zone, which is a frequency band containing no signal data. Band translation is the operation of combining band stacked signals into one or more outputs and may include, for example frequency mixing and/or frequency translating of one or more signals.

For example, if a set top box has two tuners, it may receive signals from two separate satellites. Each satellite generally transmits a left-hand circular polarized signal and a right-hand circular polarized signal. Thus, if a set top box has two tuners, it may receive four signals—two from each satellite. The two signals from each satellite may be band stacked into a single input signal, thus yielding two input signals in total (one for each satellite). These band stacked signals may then be translated to yield two different stacked outputs. The first stacked output may contain, for example, the left-hand circular polarized feed from each of the first and second satellites while the second stacked output may contain the right-hand circular polarized feed from each of the satellites. Band stacking and band translation are more thoroughly described in U.S. patent application Ser. No. 11/256,472, filed Oct. 20, 2005; and U.S. patent application Ser. No. 11/140,330, filed May 27, 2005, both naming Edmund F. Petruzzelli as inventor.

The process of band stacking generally requires a relatively high-frequency signal produced by a local oscillator in a low noise block converter feedhorn ("LNBF") of a customer's receiving system. However, accurate high-frequency local oscillators can be expensive. Further, it is more difficult to produce an accurate high-frequency local oscillator than a low-frequency local oscillator, and high-frequency local oscillators may have a shorter service life. Accordingly, there is a need in the art for an improved low noise block converter feedhorn.

SUMMARY

Certain embodiments may take the form of a circuit, electrical device or other apparatus for band stacking and/or band translating multiple transmissions. Such transmissions may be, for example, satellite transmissions, terrestrial transmissions, signals carried across a wired network such as a cable network, and so forth. One example of an apparatus embodying an exemplary embodiment is a low noise block feedhorn.

As one example, two sets of left-hand polarized and right-hand polarized signals may be accepted by an embodiment. One left-hand polarized signal and one right-hand polarized signal may be band stacked such that the left-hand polarized signal occupies a first band frequency and the right-hand polarized signal occupies a second frequency, thereby permitting the two signals to be transmitted simultaneously across a single transmission line as a first unique signal (e.g., the two may be combined into a single signal). The second left-hand polarized signal and second right-hand polarized signal may likewise be combined into a second unique signal for transmission.

The first and second unique signals may be stacked as a first stacked output and a second stacked output by a band translating circuit.

One embodiment may take the form of a low noise block converter feedhorn, comprising: a signal receiver operative to receive at least a first input signal and a second input signal; a first mixer operative to receive the first input signal from the signal receiver, further operative to mix the first input signal with a first reference signal to create a first translated signal; and a second mixer operative to receive the second input signal from the signal receiver, further operative to mix the second input signal with the first reference signal to create a second translated signal; a third mixer operative to mix the first translated signal with a second reference signal to create a third translated signal; and a first combiner operative to stack the third translated signal and second translated signal into a first single stacked signal.

Another embodiment may take the form of a method for converting at least a first incoming transmission and a second incoming transmission to an outgoing transmission, comprising the operations of: receiving a first incoming transmission; receiving a second incoming transmission; multiplexing the first incoming transmission with a first reference signal to create a first multiplexed signal; multiplexing the second incoming transmission with a second reference signal to create a second multiplexed signal; multiplexing the second multiplexed signal with a third reference signal to create a third multiplexed signal; and diplexing the second and third multiplexed signals to create a first band-stacked signal.

Yet another embodiment may take the form of an apparatus for converting at least one right-hand polarized signal and at least one left-hand polarized signal into a stacked output, comprising: a first signal receiver for receiving a first right-hand polarized signal and a first left-hand polarized signal; a first signal generator; a first multiplexer electrically connected to the first signal generator and the first signal receiver; a second multiplexer electrically connected to the first signal generator and the first signal receiver; and a band translating circuit electrically connected to the first and second multiplexers, the band translating circuit outputting at least a first stacked output.

BRIEF DESCRIPTION OF THE DRAWINGS

Various details of the embodiments disclosed herein may be better understood on reading the following detailed description of non-limiting embodiments, and on examining the accompanying drawings, in which.

DETAILED DESCRIPTION

Figure 1:
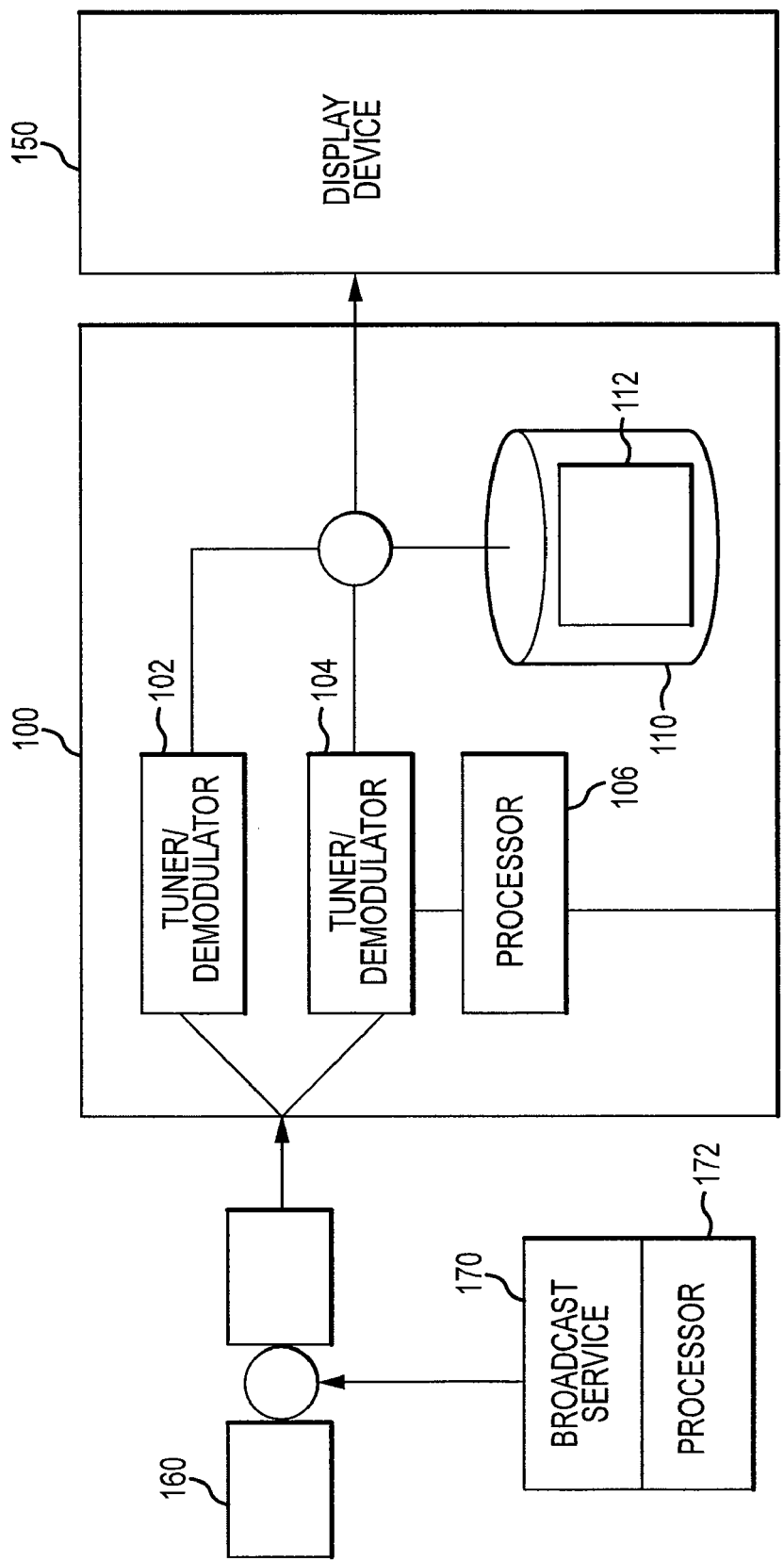
FIG. 1 is an exemplary block diagram illustrating components of an example of a broadcast satellite television system.

In this specification, embodiments will be described using methods and systems related to subscriber satellite television service. This detailed description is not limited to any specific embodiment described herein. Various embodiments may also be applicable to cable television systems, broadcast television systems or other television systems. Certain embodiments are also described in terms of digital video recorder (DVR) devices. These embodiments may also be applicable to digital versatile disc (DVD) recording devices or other television recording devices. It should be understood that embodiments can apply elsewhere, such as in personal computing devices (handheld or otherwise). While the various embodiments have been particularly shown and described, it should be appreciated that various other changes in the form and details may be made therein without departing from the spirit and scope of the invention.

As a general matter, the disclosure uses the term "signal." The referenced signal may be any digital or analog signal. Accordingly, signals may include, but are not limited to, a bit, a specified set of bits, an A/C signal, or a D/C signal. Uses of the term "signal" in the description may include any of these different interpretations. It should also be understood that the term "connected" is not limited to a physical connection but can refer to any means of communicatively or operatively coupling two devices.

As another general matter, the disclosure uses the terms "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that has the capacity to acquire, process and distribute one or more television signals transmitted by broadcast, cable, telephone or satellite distributors. DVR and "personal video recorder (PVR)" refer interchangeably to devices that can record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. A television converter device may be implemented as an external self-enclosed unit, a plurality of external self-enclosed units or as an internal unit housed within a television. Further, various embodiments described herein can apply to analog and digital satellite set-top-boxes.

As yet another general matter, as used here, the term "television" refers to a television set or video display that may contain an integrated television converter device (e.g., an internal cable-ready television tuner housed inside a television) or, alternatively, that is connected to an external television converter device (e.g., an external set-top-box connected via cabling to a television). A further example of an external television converter device is the EchoStar Dish PVR 721, Part Number 106525, combination satellite set-top-box and DVR.

It should also be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CSPAN®, ABC®, CBS®, or ESPN®.

Further, the term "channel," as used in this description, may employ a different meaning from its normal connotation. The term "channel" is used herein to denote a particular carrier frequency or "sub-band" which can be tuned to by an appropriate tuner. In particular, note that "channel" does not refer to a single program/content service (e.g., CNN®, HBO®, CSPAN®). Similarly, "tuning" herein refers to receiving a channel (as previously defined) having multiple services thereon. A single satellite will typically have multiple transponders (e.g., 32 transponders) each one broadcasting a channel or band of approximately 24 to 27 MHz (0.024-0.027 GHz) in a broader frequency "band" of approximately 500 MHz. Thus a band of 0.5 GHz may contain numerous sub-bands or channels of roughly 24-27 MHz and each channel in turn may carry a combined stream of digital data comprising a number of content services.

The block diagrams shown in the various Figures of this description are for illustration only and are not intended to represent the only possible process flows and system configurations. In particular, it should be understood that operations may be added, omitted and recorded as may be suitable to a particular application. Also, individual components may be added, omitted, replaced and interrelated as may be suitable to a particular application. All details appurtenant to implementing the exemplary systems and methods that are well understood in the art are omitted for simplicity and clarity.

FIG. 1 is a simplified block diagram illustrating components of an example of a broadcast satellite television system that may be used to implement various features described herein. In particular, FIG. 1 generally illustrates a client device 100 as part of a satellite broadcast system. In this example, a broadcast service 170 provides programs and program information, via one or more satellites 160, to the client device 100. The broadcast service 170 may include a processor 172, which is discussed further below. The client device 100 may include suitable circuitry, other hardware and/or software to receive a signal(s) from the satellite(s) 160, such as a satellite dish or antenna (not shown).

The signal(s) from the satellite(s) 160 may carry multiple channels of programs, program information (such as electronic programming guide data), and/or other information, such as conditional access data. The signal(s) from the satellite(s) 160 received at the client device 100 may be processed such that the data and/or the channels may be viewed on a display device 150, such as a television set or monitor.

The client device 100 may include a first tuner unit 102 and a second tuner unit 104, each of which may comprise a tuner, a demodulator, and any other device or circuitry for selecting channels and modifying the data format for processing and/or displaying on the display device 150. While one of the first and second tuner units 102, 104 is selected for displaying programs and/or program information on the display device 150, the other of the first and second tuner units 102, 104 may be considered to be latent (with respect to displaying data). It should be understood that any number of tuner units may be employed, with such units not currently being used for displaying being considered latent.

The client device 100 may also include a processor 106 for controlling various operations of the client device 100 and/or the other components thereof. The client device 100 may also include a storage device 110, which may have a program and/or associated data stored thereon, in addition or alternatively to such program and/or data rendered on the display device 150. The storage device 110 may also be used to store user preferences, set-up information and/or other criteria 112, as discussed further below, usually specific to the client device 100.

Regardless of the particular implementation of the client device 100 and/or the broadcasts system in general, a system for selectively receiving at least part of a program based on events that occur in the program is contemplated. In operation, as discussed above, one of the first and second tuner units 102, 104 may be currently presenting a program for display and the other may be considered to be latent. The latent tuner unit may be used to monitor either an audio stream or a video stream, or both, of a program that is being transmitted on a channel to which the latent tuner unit is set.

It should be understood that the non-latent tuner unit may also be used to monitor the audio stream and/or video stream of the program being received thereby, but such is not described for the sake of simplicity and brevity. Such an approach may allow a user to view a program and to selectively record the program or part of the program as described herein with respect to the latent tuner unit.

As a general, simplified example, a program received by the first tuner unit 102 may be displayed and the second tuner unit 104 may be considered to be latent. The processor 106 of the client device 100 and/or the processor 172 of the broadcast service 170 may be configured to monitor programs received by the second tuner unit 104. For the sake of simplicity and brevity, operation of the processor 106 of the client device 100 is described herein. However, it should be understood that any or all client-side operations may be performed as broadcast service-side operations, as appropriate or desired.

Figure 2:
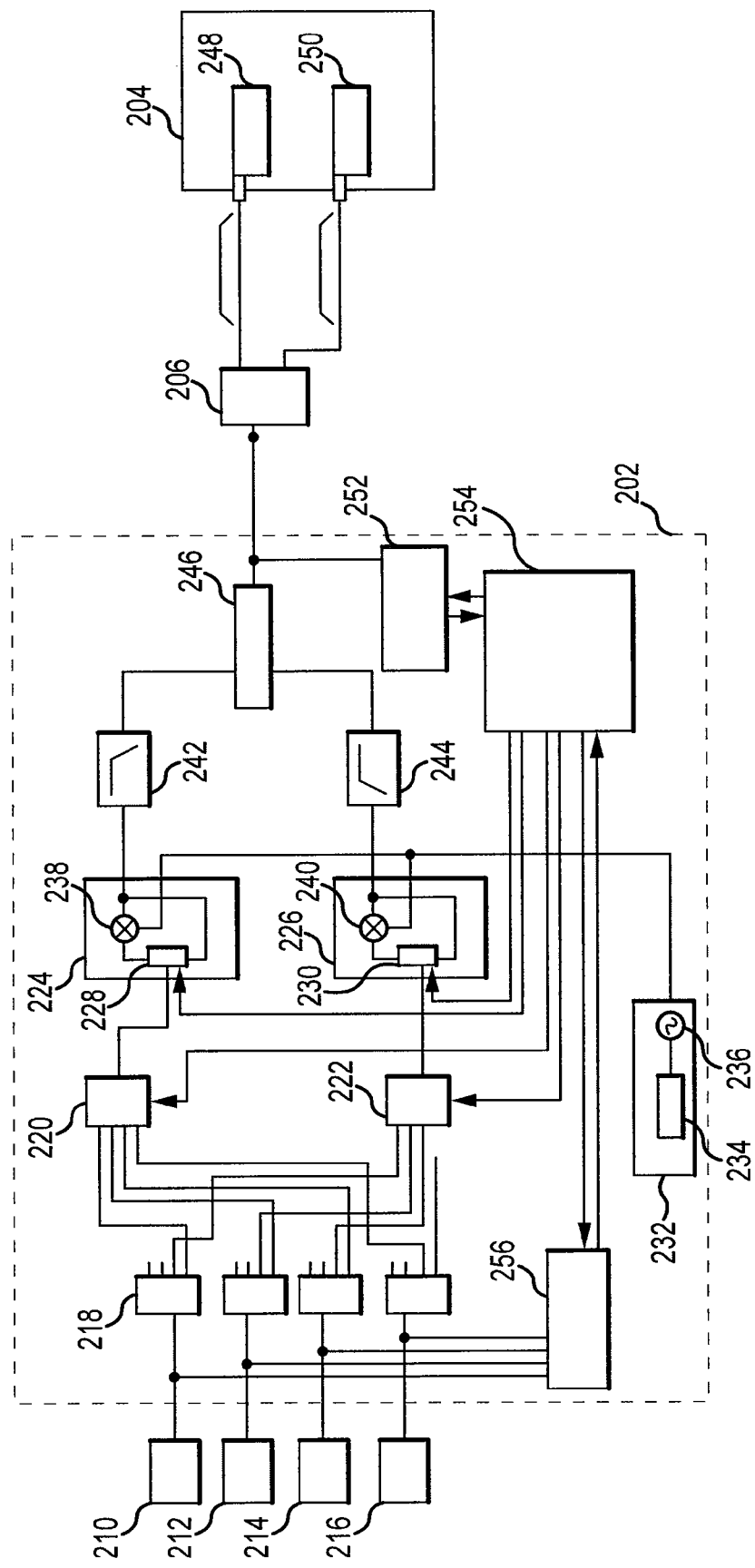
FIG. 2 is a block diagram of a multiple-satellite band translating system connected to a dual-tuner television converter device.
Figure 3:
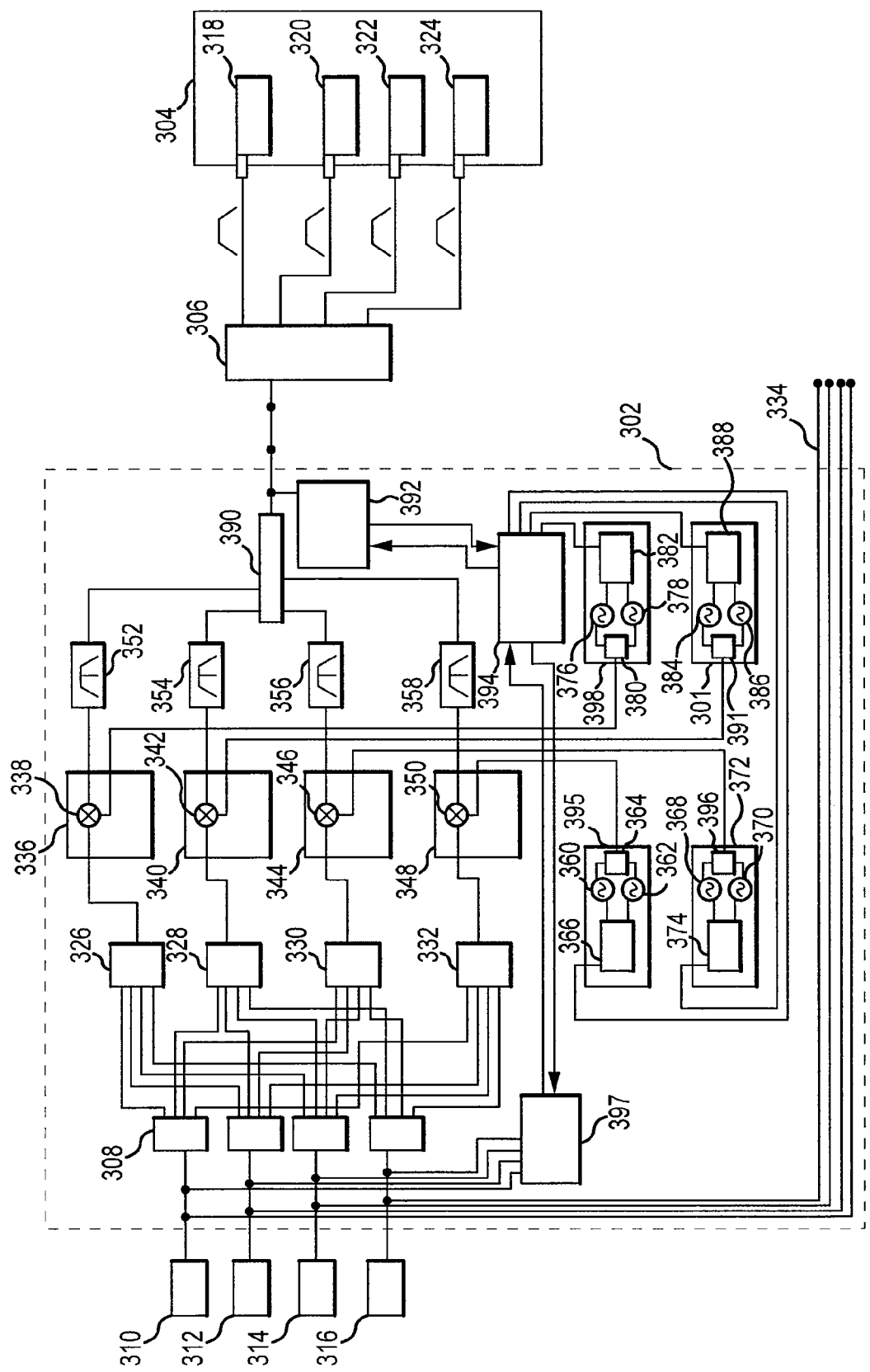
FIG. 3 is a block diagram of a multiple-satellite band translating system connected to a multiple-tuner television converter device in accordance with an embodiment.

FIG. 2 presents a block diagram of a multiple-satellite band translating system connected to a dual-tuner television converter device. FIG. 3 then presents a block diagram of a multiple-satellite band translating system connected to a multiple-tuner television converter device in accordance with a particular embodiment described herein. FIGS. 2 and 3 represent only two examples of the n-number of tuner configurations that are possible using band translation technology. It should also be understood that the arbitrary, n-number of tuner configurations do not require an even number of tuners and that band translation for an odd number of tuners is also possible and within the scope of this document. Further, the n-number of tuners may reside in devices (e.g., a personal computer) other than a television converter device in the form of a satellite set-top box ("STB").

Band translation switch 202 is connected to dual tuner television converter device 204 via separator 206. Cascade outputs (not shown) from band translation switch 202 allow band translation switch 202 to be connected with other band translation switches or conventional switches.

Band translation switch 202 receives RF input from four satellite dishes 210, 212, 214 and 216. Band translation switch 202 might be connected to a lesser or greater number of such satellite dishes. In the embodiment shown in FIG. 2, each satellite dish points to a different satellite. Dish 210 points to a satellite located at 119 degrees west longitude, dish 212 points to a satellite located at 110 degrees west longitude, dish 214 to a satellite located at 61.5 degrees west longitude and dish 216 to a satellite located at 148 degrees west longitude. All four satellites in this particular embodiment are in geosynchronous orbit (e.g., zero degrees latitude, low or zero eccentricity and 40,000 kilometers orbital radius with no relative angular velocity relative to a point on the surface of the Earth). However, should DBS systems evolve to include the ability of satellite dishes to track moving satellites (for example, the Molniya system) the band translation switch 202 may still be used without alteration. The band translation switch 202 may also be used without alteration in other television systems or communication systems now known or later developed, as circumstances require.

The output from exemplary dish 210 is sent to power divider 218. In the embodiment depicted in FIG. 2, power divider 218 is a four way power divider, supporting a total of four tuners, for example, two television converter devices each having dual tuners. However, the power dividers of band translation switch 202 may be scaled from four outputs to six, allowing switch 502 to support up to six tuners, such as would be present in a three dual-tuner television converter device system.

The outputs from the power dividers 218 are sent to source selection switches 220 and 222. In one embodiment, two additional source selection switches (not pictured) are also present in band translation switch 202. Every source selection switch receives the signals from every satellite dish 210, 212, 214, and 216, in this embodiment. Note that since the signals received are polarized (left-hand, right-hand, vertical, horizontal or other polarization), each dish is actually bandstacking and sending to the source selection switches 220, 222 two pre-stacked bands of data. Thus in this embodiment source selection switch 220, for example, may be receiving up to eight 0.5 GHz wide bands of data (two bands per satellite dish) but will be selecting the output from one satellite only (two bands of data) for transmission to the next stage of processing.

The output from source selection switch 220 goes to low band translator 224 (LBT). LBT 224 includes signal path switch 228 allowing bypass of the low band translation function, depending upon which band of the two pre-stacked bands received from switch 220 is the desirable band. If translation is desired, signal path switch 228 causes band translation at frequency mixer 238. If translation of the frequency bands is not desired, signal path switch 228 will bypass frequency mixer 238 and the translation function will not occur.

Translation is accomplished in frequency mixer 238 by summation-difference with a 3.1 GHz signal obtained from clock/frequency generator 232, which may be made of a phase locked loop 234 and an oscillator 236. (In some embodiments, only the phase locked loop or the oscillator are present in the generator 232). The translated or bypassed band is then passed through low pass filter 242 (LPF). LPF 242 ensures that the signal sent from low band translator 224 is cut off beginning at approximately 1450 MHz. In present embodiment, the operative connection from low band translator 224 to frequency stacker 246 is by way of LPF 242, with such circuitry, wiring or cables as is in turn required between these components, however, in other embodiments the operative connection may be only circuitry, wiring, coaxial cable or other cabling.

In a like manner, the output from satellite selector switch 222 is sent to high band translator 226. Switch 230 either sends the signal to frequency mixer 240 (once again driven by local oscillator 236) or bypasses the high band translation operation. The output from high band translator 226 is sent to high pass filter 244 which cuts off frequencies below approximately 1650 MHz.

Note that signal path switches 228 and 230 thus have at least two positions: first positions in which band translators 224 and 226 are in the circuit; and second positions in which signal path switches 228 and 230 cause the band translators 224 and 226 to be bypassed, in which case the translators are said to be "out of the circuit."

The two signals are combined after LPF 242 and HPF 244 in frequency stacker 246, then sent to separator 206. The tuner 247 is programmed to accept frequencies from 950 MHz to 1450 MHz while tuner 250 is programmed to accept frequencies from 1650 MHz to 2150 MHz, effectively re-dividing the signal on that basis. The 0.2 GHz bandwidth between 1450 MHz and 1650 MHz is referred to as a "guard band" and usually contains the quickly degrading frequencies cut off by LPF 242 and HPF 244: these cut off frequencies may drop by many dB before crossing the guard bandwidth, at which reduced level they do not significantly impact the signal being read by the other tuner.

In operation, tuners 248 and 250 may signal to band translation switch 202 a satellite and polarity on which may be found the desired service for each tuner. (In alternative embodiments, one tuner may transmit all commands discussed herein while the second tuner passively receives data and/or responds to the first tuner's commands, thus acting as a slave tuner.) Source selection switches 220 and 222 may each select the proper satellite dish, which may be the same or a different dish. Each satellite switch 220, 222 will pass both bands from the selected satellite (pre-stacked from the different polarity signals sent on the same frequency to the dishes) to the band translators 224, 226. Low band translator 224 generally determines if the signal to be sent to tuner 248 is already in the lower (950-1450 MHz) band and if so, it will bypass translation and simply send the signal to LPF 242, which will filter out the higher frequency band. However if the signal is in the higher frequency band of 1650-2150 MHz, then signal path switch 228 will send the signal to frequency mixer 238 to down-convert the frequency of the desired signal to the lower band. (Note that in this event, the undesired lower frequency signal will have its frequency reduced from the lower band to an even lower frequency range (sub 950 MHz), below what tuner 248 recognizes.)

High band translator 226 (HBT) will carry out the converse process: it generally determines if the signal to be sent to tuner 250 is already in the higher band and if so, will bypass high band translation and simply send the signal to HPF 244. On the other hand, if the signal which is desired by tuner 250 (programmed to accept the higher frequency band) is in the lower frequency band, then switch 230 will send the signal to frequency mixer 240 to up-convert the frequency of the desired signal to the higher range. In this case, the higher of the two bands sent to HBT 226 will be translated to a value above the highest frequency (2.15 GHz) which tuner 250 typically does not recognize.

The result is that either tuner may request any frequency band from any satellite and yet receive it in the frequency range for which that tuner has already been programmed, thus eliminating the need for television converter device 204 to accept frequency bands as they arrived from the satellite dishes.

While only one television converter device 204 is shown, band translation switch 202 equipped with four-way power dividers 218, for example, that can support two entirely independent dual tuner television converter devices via additional source selection switches, LBT, LPF, HBT, HPF and a frequency stacker. As stated earlier, by means of six-way power dividers, three dual tuner television converter devices could be supported. It should be appreciated that several n-tuner configurations are possible.

Note that LPF 242, HPF 244 and frequency stacker 246 effectively amount to a diplexer. However, band translation switch 202 may have additional circuitry (intermediate band translators, intermediate bandpass filters, etc.) so as to function as a multiplexer; that is, to stack more than two bands into the output frequencies. Such a configuration might require tuners having additional spectrum recognition abilities and/or constraints on the use of coaxial cable (which might have shorter allowable runs, additional features to increase bandwidth or may be replaced with other forms of connection) but would not exceed the scope of the invention as claimed herein. In such a system, band translation switch 202 may support more than two tuners in a single television converter device on a single coaxial cable. For example, a first frequency band and a second frequency band of a single coaxial cable may be sub-divided so as to contain two frequency bands in each of the first and second frequency bands. In this example, four tuners in a single television converter device may then receive the four output frequency bands. Band translation switch 202 may also be reconfigured to support multiple-tuner television converter device configurations.

In operation, it is possible that the two bands stacked for transmission to the dual tuner television converter device might come from different satellites or the same satellites, or might even be the same band, bandstacked onto itself. The original frequencies of the two bands may even become reversed in the band translation switch. In any embodiment, however, each tuner can receive its desired band in the frequency band it is pre-programmed to receive. Each tuner then performs RF tuning to the appropriate sub-band/channel, demodulating and demultiplexing; and digitally processing the chosen program service from among those program services on the channel.

The control system of switch 202 is also depicted. In operation, control signal detection and transmission interface 252 will detect control signals sent by tuners 248 and 250 and cooperate with microcontroller 254. In the present two-tuner embodiment, the control signals sent by tuners 248 and 250 will be designated as master and slave. For example, a master or primary control signal may be sent by tuner 248, while a slave or secondary signal is sent by tuner 250. Alternatively, the second tuner 250 may transmit nothing and merely receive data. Designation of control signals as master and slave may reduce the processing time of the control signal detection and transmission interface 252 and microcontroller 254. In another embodiment, the control signals sent by tuners 248 and 250 may operate independently. Microcontroller 254 has control authority over signal path switches 228 and 230, satellite selection switches 220 and 222 and control signal detection and transmission interface 256. Interface 256 may be a second control signal detection and transmission interface separate from interface 252, or in alternative embodiments the two structures may be combined. For example, the mere presence or absence of a signal may be used, respectively, to indicate a master or slave primary control signal.

In operation, signals sent from tuners 248 and 250 are used by microcontroller 254 to control the satellite selection switches 220 and 222; by this structure the appropriate satellite signals are sent to LBT 224 and HBT 226. Microcontroller 254 also controls signal path switches 228 and 230 independently from each other in order to determine whether band translation occurs in each translator; as a result of this, the band requested by tuners 248, 250, arrives at the tuner in the correct frequency band. In addition to signals sent from tuners 248, 250 to microcontroller 254, other signals are sent from tuners 248, 250 having preambles which indicate that they are to be passed through to the low noise block feedhorn (LNBF) at the satellite dish.

As set forth earlier, FIG. 3 depicts a block diagram of a multiple-satellite band translating system connected to a multiple-tuner television converter device in accordance with an exemplary embodiment.

Band translation switch 302 is connected to a four tuner television converter device 304 via separator 306. Cascade outputs 334 from band translation switch 302 allow band translation switch 302 to be connected with other band translation switches or conventional switches in a manner similar to the embodiment previously discussed with reference to FIG. 2.

Band translation switch 302 receives RF input from four satellite dishes 310, 312, 314 and 316. Band translation switch 302 might be connected to a lesser or greater number of such satellite dishes. In the embodiment shown in FIG. 3, each satellite dish points to a different satellite. Dish 310 points to a satellite located at 119 degrees west longitude, dish 312 points to a satellite located at 110 degrees west longitude, dish 314 to a satellite located at 61.5 degrees west longitude and dish 316 to a satellite located at 148 degrees west longitude. All four satellites in this particular embodiment are in geosynchronous orbit, as defined above. However, should DBS systems evolve to include the ability of satellite dishes to track moving satellites (for example, the Molniya system) the band translation switch 302 may still be used without alteration. The band translation switch 302 may also be used without alteration in other television systems or communication systems now known or later developed, as circumstances require.

The output from exemplary dish 310 is sent to power divider 308. In the embodiment depicted in FIG. 3, power divider 308 is a four-way power divider and supports a total of four tuners in a single television converter device. It should be understood, however, that n-number of tuners is possible and that placement of the n-number of tuners need not occur in the same television converter device. For example, two television converter devices may each have dual tuners. Likewise, the power dividers of band translation switch 302 may also be scaled from four outputs to six, allowing switch 302 to support up to six tuners, such as would be present in a three dual-tuner television converter device system.

The outputs from the power dividers, such as power divider 308, are sent to source selection switches 326, 328, 330, and 332. Every source selection switch receives the signals from every satellite dish 310, 312, 314, and 316, in this embodiment. Note that since the signals received are polarized (left-hand, right-hand, vertical, horizontal or other polarization), each dish is actually bandstacking and sending to the source selection switches 326, 328, 330, and 332 four pre-stacked bands of data or a bank of independent polarization bands. Thus in this embodiment source selection switch 326, for example, may be receiving up to eight 0.5 GHz wide bands of data (two bands per satellite dish) but will be selecting the output from one satellite only (two bands of data) for transmission to the next stage of processing.

The output from source selection switch 326 goes to low band translator (LBT) 336. LBT 336 includes frequency mixer 338. Band translation is accomplished in frequency mixer 338 by summation-difference with a signal obtained from low band oscillator unit (LBOU) 398: a local oscillator path switch; a phase locked low band translation oscillator 376; a phase locked high band translation oscillator 378; and an oscillator control 382. Local oscillator path switch 380 allows appropriate translation depending upon the desired band set forth by the oscillator control 382. If high band translation is desired by the oscillator control 382, phase locked translation oscillator 376 translates the signal using a frequency of approximately 2675 MHz to 3175 MHz and creates a signal at approximately 1025 MHz from frequency mixer 338. If low band translation is desired by the oscillator control 382, phase locked oscillator 378 converts the signal at a frequency of approximately 1975 MHz to 2475 MHz and creates a 1025 MHz signal from an output of the frequency mixer 338. It should be appreciated that other band translation and bypass structures are possible within the LBOU. Further, several other translation and bypass signal oscillation frequencies are possible for use in various embodiments and fall within the scope of this disclosure. The translated band is then passed through band pass filter (BPF) 352. BPF 352 ensures that the signal sent from low band translator 336 is cut off at frequencies below approximately 950 MHz and above 1100 MHz and passes the desired channel at 1025 MHz with little or no attenuation.

In a like manner, the output from satellite selector switch 928 may be sent to a second band translator (SBT) 340. SBT 340 includes frequency mixer 342. Band translation is accomplished in frequency mixer 342 by summation-difference with a signal obtained from low mid-range band oscillator unit (LMBOU) 301: a local oscillator path switch 391; a phase locked low band translation oscillator 384; a phase locked high band translation oscillator 386; and an oscillator control 388. Local oscillator path switch 391 allows appropriate translation depending upon the desired band set forth by the oscillator control 388. If high band translation is desired by the oscillator control 388, phase locked translation oscillator 384 translates the signal using a frequency of approximately 3025 MHz to 3525 MHz and creates an approximately 1375 MHz signal from frequency mixer 342. If low band translation is desired by the oscillator control 388, phase locked oscillator 386 converts the signal at a frequency of approximately 2325 MHz to 2825 MHz and creates a 1375 MHz signal from frequency mixer 342. Additionally, it should be appreciated other band translation and bypass structures may be implemented within the LMBOU and/or other embodiments. Further, several other translation and bypass signal oscillation frequencies are possible and within the contemplated scope. The translated band is then passed through low mid-range pass filter (LMPF) 354. LMPF 354 ensures that the signal sent from SBT 340 is cut off at frequencies below approximately 1300 MHz and above 1450 MHz and passes the desired channel at 1025 MHz with little or no attenuation.

Similarly, the output from satellite selector switch 330 is sent to a third band translator (TBT) 344. TBT 344 includes frequency mixer 346. Band translation is accomplished in frequency mixer 646 by summation-difference with a signal obtained from high mid-range band oscillator unit (HMBOU) 396: a local oscillator path switch 372; a phase locked low band translation oscillator 368; a phase locked high band translation oscillator 370; and an oscillator control 374. Local oscillator path switch 372 allows appropriate translation depending upon the desired band set forth by the oscillator control 374. If high band translation is desired by the oscillator control 374, phase locked translation oscillator 368 translates the signal using a frequency of approximately 3375 MHz to 3875 MHz and creates an approximately 1725 MHz signal from frequency mixer 346. If low band translation is desired by the oscillator control 374, phase locked oscillator 370 converts the signal at a frequency of approximately 2675 MHz to 3175 MHz and creates a signal at approximately 1725 MHZ from frequency mixer 346. One skilled in the art will recognize that other band translation and bypass structures are possible within the HMBOU. Further, other translation and bypass signal oscillation frequencies are possible and within the scope of this document. The translated band is then passed through high mid-range pass filter (HMPF) 356. HMPF 356 ensures that the signal sent from TBT 344 is cut off at frequencies below approximately 1650 MHz and above 1800 MHz and passes the desired channel at 1725 MHz with little or no attenuation.

Finally, to describe the last translator of this embodiment, the output from satellite selector switch 332 is sent to a high band translator (HBT) 348. HBT 348 includes frequency mixer 350. Band translation is accomplished in frequency mixer 350 by summation-difference with a signal obtained from high band oscillator unit (HBOU) 395: a local oscillator path switch 364, a phase locked low band translation oscillator 360, a phase locked high band translation oscillator 362 and an oscillator control 366. Local oscillator path switch 364 allows appropriate translation depending upon the desired band set forth by the oscillator control 366. If high band translation is desired by the oscillator control 366, phase locked translation oscillator 360 translates the signal using a frequency of approximately 3725 MHz to 4225 MHz and creates an approximately 2075 MHZ signal from frequency mixer 350. If low band translation is desired by the oscillator control 366, phase locked low band translation oscillator 362 converts the signal at a frequency of approximately 3025 MHz to 3525 MHz and creates an approximately 2075 MHz signal from frequency mixer 350. The translated band is then passed through high band pass filter (HBPF) 358. HBPF 358 ensures that the signal sent from HBT 348 is cut off at frequencies below approximately 2000 MHz and above 2150 MHz and passes the desired channel at 2075 MHz with little or no attenuation.

In the present embodiment, the operative connection from band translators 336, 340, 344 and 348 to frequency stacker 390 is by way of BPF 352, LMPF 354, HMPF 356 and HBPF 358, with such circuitry, wiring or cables as are in turn required between these components, however, in other embodiments the operative connection may be only circuitry, wiring, coaxial cable or other cabling.

The four signals are combined from BPF 352, LMPF 354, HMPF 356 and HBPF 358 in frequency stacker 390; the combined signal then is sent to splitter 306. Tuner 318 is programmed to accept frequencies from 950 MHz to 1100 MHz (centered at 1025 MHz), tuner 320 is programmed to accept frequencies from 1300 MHz to 1450 MHz (centered at 1375 MHz), tuner 322 is programmed to accept frequencies from 1650 MHz to 1800 MHz (centered at 1725 MHz) and tuner 324 is programmed to accept frequencies from 2000 MHz to 2150 MHz (centered at 2075 MHz). (It should be understood that these frequencies, like all frequencies mentioned herein, are exemplary rather than limiting. Alternative embodiments may employ different tuner, translation, and/or other frequencies.) Each tuner 318, 320, 322, and 324 effectively re-divides the signal by these frequency programming ranges. The 0.2 GHz bandwidth between 1450 MHz and 1650 MHz, for example, is referred to as a "guard band" and usually contains the quickly degrading frequencies cut off by LMPF 354 and HMPF 356. These cut off frequencies may drop by many dB before crossing the guard bandwidth, at which reduced level they typically do not significantly impact the signal being read by the other tuner.

In operation, tuners 318, 320, 322 and 324 will signal to band translation switch 302 which satellite and polarity on which may be found the desired service for each tuner. Source selection switches 326, 328, 330 and 332 will each select the proper satellite dish, which may be the same or a different dish. Each satellite switch 326, 328, 330 and 332 will pass both bands from the selected satellite (pre-stacked from the different polarity signals sent on the same frequency to the dishes) to the band translators 336, 340, 344, and 348.

The result of the embodiment described above is that either tuner may request any frequency band from any satellite and yet receive it in the frequency range for which that tuner has already been programmed, thus eliminating the need for television converter device 604 to accept frequency bands as they arrived from the satellite dishes.

Note that BPF 352, LMPF 354, HMPF 356, BPF 358 and frequency stacker 390 effectively amount to a multiplexer; that is, more than two bands are stacked into multiple output frequencies. It should be appreciated that this multiplexer configuration typically requires tuners to have additional spectrum recognition abilities and/or constraints on the use of coaxial cable (which may have shorter allowable runs, additional features to increase bandwidth or may be replaced with other forms of connection) that are within the scope as set forth herein. In such a system, as is evident from FIGS. 2 and 3, a band translation switch may support more than two tuners in a single television converter device on a single coaxial cable. As is also evident from the drawings, band translation switches may also be reconfigured so as to support one or more single tuner television converter devices from a single coaxial cable carrying a signal from one or more satellite dishes.

The control system of switch 302 is also depicted. In operation, control signal detection and transmission interface 392 will detect control signals sent by tuners 318, 320, 322 and 324 and cooperate with microcontroller 394. In this embodiment, the control signals sent by tuners 318, 320, 322 and 324 operate independently. Several control signaling paradigms are possible in various embodiments. Microcontroller 394 has control authority over band translation oscillator control 366, 374, 382, 388 and control signal detection and transmission interface 397. Interface 397 may be a second control signal detection and transmission interface separate from interface 392, or in alternative embodiments the two structures may be combined.

In operation, signals sent from tuners 318, 320, 322 and 324 are used by microcontroller 394 to control the low band translation oscillators 360, 368, 376, 384 and high band translation oscillators 362, 370, 378, 386; by this structure the appropriate satellite signals are sent to LBT 336, SBT 340, TBT 344 and HBT 348. In addition to signals sent from tuners 318, 320, 322 and 324 to microcontroller 394, other signals are sent from tuners 318, 320, 322 and 324 having preambles which indicate that they are to be passed through to the LNBF at the satellite dish.

In particular, one of tuners 318, 320, 322 and 324 may request a particular channel or program, for example in response to a user input. The tuner then may instruct the microcontroller 394, which is electrically connected to all switches 326, 328, 330, 332, to determine which satellite input 310, 312, 314, 316 provides the desired channel or program. (Alternatively, the tuner itself may make this determination and pass the desired satellite input to the microcontroller.) The microcontroller stores the frequency range of each tuner 318, 320, 322, 324 and thus may electrically connect the proper satellite input to the band translator 336, 340, 344, 348 that translates signals into the tuner's frequency range. Essentially, each tuner has a dedicated band translator that translates an input signal into a frequency within the frequency band accepted by the tuner.

For example, presume that tuner 318 accepts frequencies from 950 MHz to 1100 MHz and centered at 1025 MHz, as generally discussed above. Further presume that band translator 336 translates an input signal to have a frequency within this range, as again described above. Accordingly, band translator 336 is dedicated to frequency shifting (e.g., translating) an input signal to a frequency recognized and accepted by the tuner 318. Because switch 326 is connected both to band translator 336 and each of the satellite inputs 310, 312, 314, 316, at the direction of the microcontroller 394 the switch 326 may connect any input to the band translator 336. Thus, once tuner 318 requests a particular channel or program, the microcontroller may instruct the switch 326 to connect the corresponding input to the band translator 336. The band translator, in turn, translates the input signal's frequency into one accepted by the tuner 318.

Thus, in short, each tuner has a dedicated band translator and each band translator may translate any of the input signals as necessary. The result of this particular embodiment described is that either tuner may request any frequency band from any satellite and yet receive it in the frequency range for which that tuner has already been programmed, thus eliminating the need for television converter device 304 to accept frequency bands as they arrived from the satellite dishes.

Note that BPF 352, LMPF 354, HMPF 356, HBPF 358 and frequency stacker 390 effectively amount to a multiplexer; that is, more than two bands ("subbands") are stacked into multiple output frequencies. It should be appreciated that this multiplexer configuration typically requires tuners to have additional spectrum recognition abilities and/or constraints on the use of coaxial cable (which may have shorter allowable runs, additional features to increase bandwidth or may be replaced with other forms of connection) that are within the scope as set forth herein. In such a system, as is evident from FIGS. 2 and 3, a band translation switch may support more than two tuners in a single television converter device on a single coaxial cable. As is also evident from the drawings, band translation switches may also be reconfigured so as to support one or more single tuner television converter devices from a single coaxial cable carrying a signal from one or more satellite dishes.

The control system of switch 302 is also depicted. In operation, control signal detection and transmission interface 392 will detect control signals sent by tuners 318, 320, 322 and 324 and cooperate with microcontroller 394. In this embodiment, the control signals sent by tuners 318, 320, 322 and 324 operate independently. Several control signaling paradigms are possible in various embodiments. Microcontroller 394 has control authority over band translation oscillator control 366, 374, 382, 388 and control signal detection and transmission interface 397. Interface 397 may be a second control signal detection and transmission interface separate from interface 392, or in alternative embodiments the two structures may be combined.

In operation, signals sent from tuners 318, 320, 322 and 324 are used by microcontroller 394 to control the low band translation oscillators 360, 368, 376, 384 and high band translation oscillators 362, 370, 378, 386; by this structure the appropriate satellite signals are sent to LBT 336, SBT 340, TBT 344 and HBT 348. In addition to signals sent from tuners 318, 320, 322 and 324 to microcontroller 394, other signals are sent from tuners 318, 320, 322 and 324 having preambles which indicate that they are to be passed through to the LNBF at the satellite dish.

In the band translation switches described herein, at least two switching protocols may be used: proprietary 13/18 switching and the DiSEqC 2.0 protocol. In the former technique, television converter devices send proprietary commands to the band translation switch by varying the length and pattern of the 13 volt or 18 volt potential. Based on the commands sent, the band translation switch selects the appropriate signal to send back to the sending television converter devices. Referring once again to FIG. 3, the 13/18 polarity may be passed directly by switch 302 to dish/LNBFs 310, 312, 314, 316, or switch 302 may maintain constant polarity. In one embodiment presently contemplated, the DiSEqC 2.0 protocol is used. The DiSEqC 2.0 protocol, unlike the 13/18 polarity method, allows for bidirectional communication among the five components of the switching system. Television converter devices 304 provide the current to operate switch 302 and the LNBFs located at dish/LNBFs 310, 312, 314, 316. In other embodiments, switch 302 may be integrated with, included within or housed inside of an LNBF. Under either protocol, television converter devices 304 are capable of independent operation in which the activities of one box do not effect the activities of the other. Under either protocol, tuners are capable of independent operation in which the activities and band selected by one tuner do not effect the activities of the other.

Figure 4:
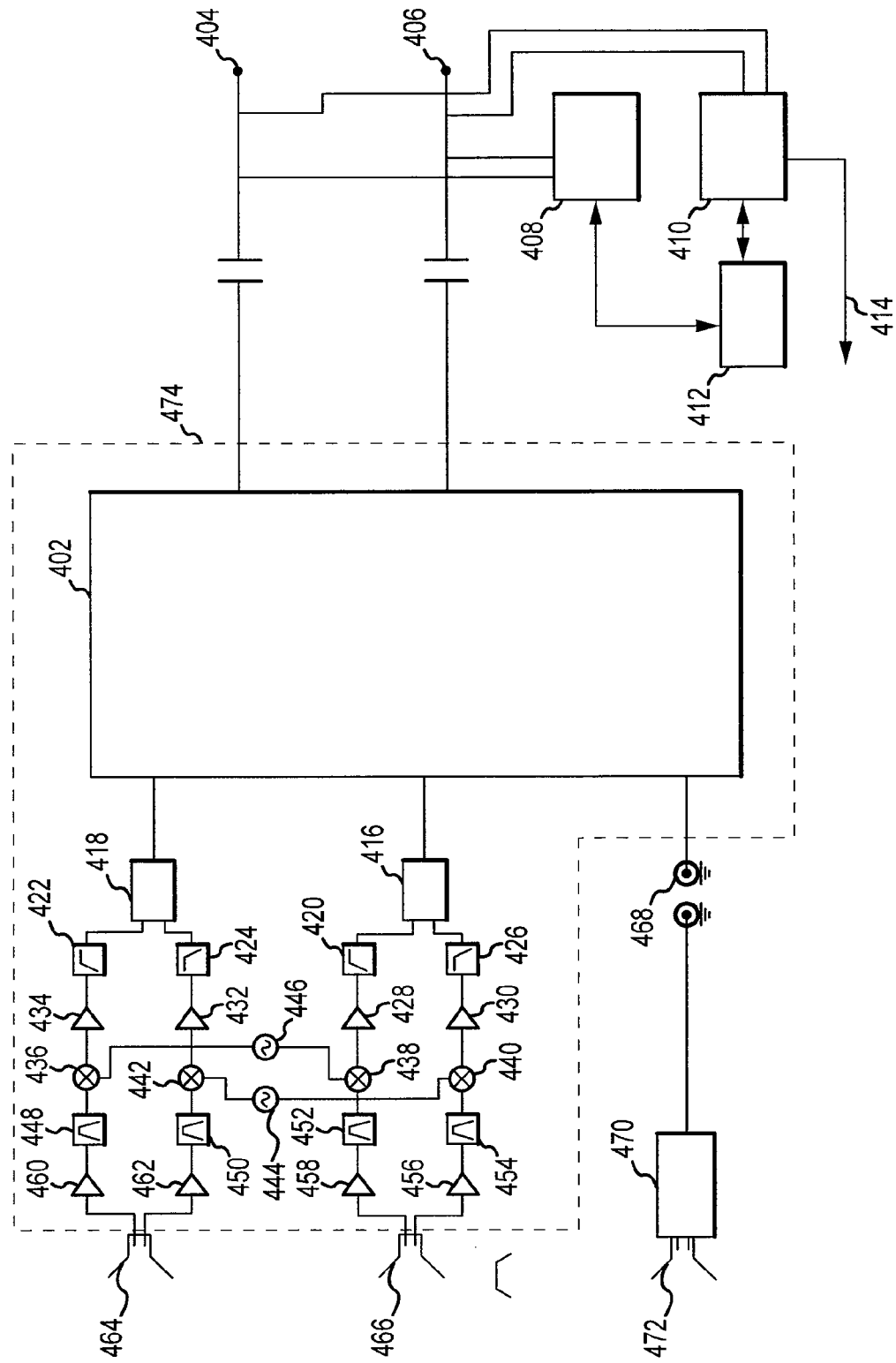
FIG. 4 is a block diagram of a low noise block converter embodiment employing a band translating system.

FIG. 4 depicts a band-stacked low-noise block converter (LNB) embodiment of the method for band translation. In this embodiment, LNB 474 contains band translation block 402 and is connected to satellites 464, 466 that receive, respectively, signals from satellites located at 119 degrees west longitude and 110 degrees west longitude. Dish 464 receives signals that are left-hand circular polarized (LHCP) in the frequency band range of 12.2 to 12.7 GHz and right-hand circular polarized (RHCP) in the frequency band range of 12.2 to 12.7 GHz. Likewise, dish 466 also receives signals that are left-hand circular polarized (LHCP) in the frequency band range of 12.2 to 12.7 GHz and right-hand circular polarized (RHCP) in the frequency band range of 12.2 to 12.7 GHz. Alternatively, in another embodiment, dish 464 may receive a single polarity band that comprises a single satellite signal. Various embodiments may employ several satellite orbital locations and radio frequency bands in addition to those described herein. LNB 474 is optionally connected via Aux LNBF Input 468 to a band-stacked LNB 470 input (but may be connected in a variety of different manners in alternative embodiments).

LNB 474 may include circuitry to maintain signal bands, including amplifiers 460, 462, 434, 432, 458, 456, 428, 430. It should be appreciated that the signal processing circuitry shown is exemplary; alternative configurations may be employed in various embodiments. LNB 474 also includes signal frequency mixers 436 and 438 that are connected via local signal oscillator 446. Local signal oscillator 446, operating in this embodiment at a signal frequency of 14.35 GHz, band-stacks the received LHCP signals 448, 452 from two independent satellite dishes 464, 466 into signals 422, 420. Similarly, LNB 474 also includes signal frequency mixers 442 and 440 that are connected via local signal oscillator 444. Local signal oscillator 444, operating in this embodiment at a signal frequency of 11.25 GHz, band-stacks the received RHCP signals 450, 454 from two independent satellite dishes 464, 466 into signals 424, 426. Frequency stackers 416 and 418 then combine signals 420 and 426 and 424 and 422 as respective pairs. (In the present embodiment, each combiner combines only two bands, although this may vary in other embodiments.) LNB 474 also includes band translation block 402. Band translation block 402 receives combined signals and processes the requests for specific bands contained within the received signals. Alternative circuit elements and different combinations of existing elements may be used in alternative embodiments, including non-stacked frequency bands.

Band-stacked output signals from LNB 474 are identified as port 1 404 and port 2 406. Port 1 404 and port 2 406 may be connected to individual or multiple tuners that may request delivery of specific signal bands. Furthermore, the signals carried on output ports 404 and 406 from LNB 474 may also be connected to other RF processing elements, including but not limited to DiSEqC 2.0/XMT switching protocol detection unit 408, processing unit 412, voltage supplies 414 and power management unit 410.

Figure 5:
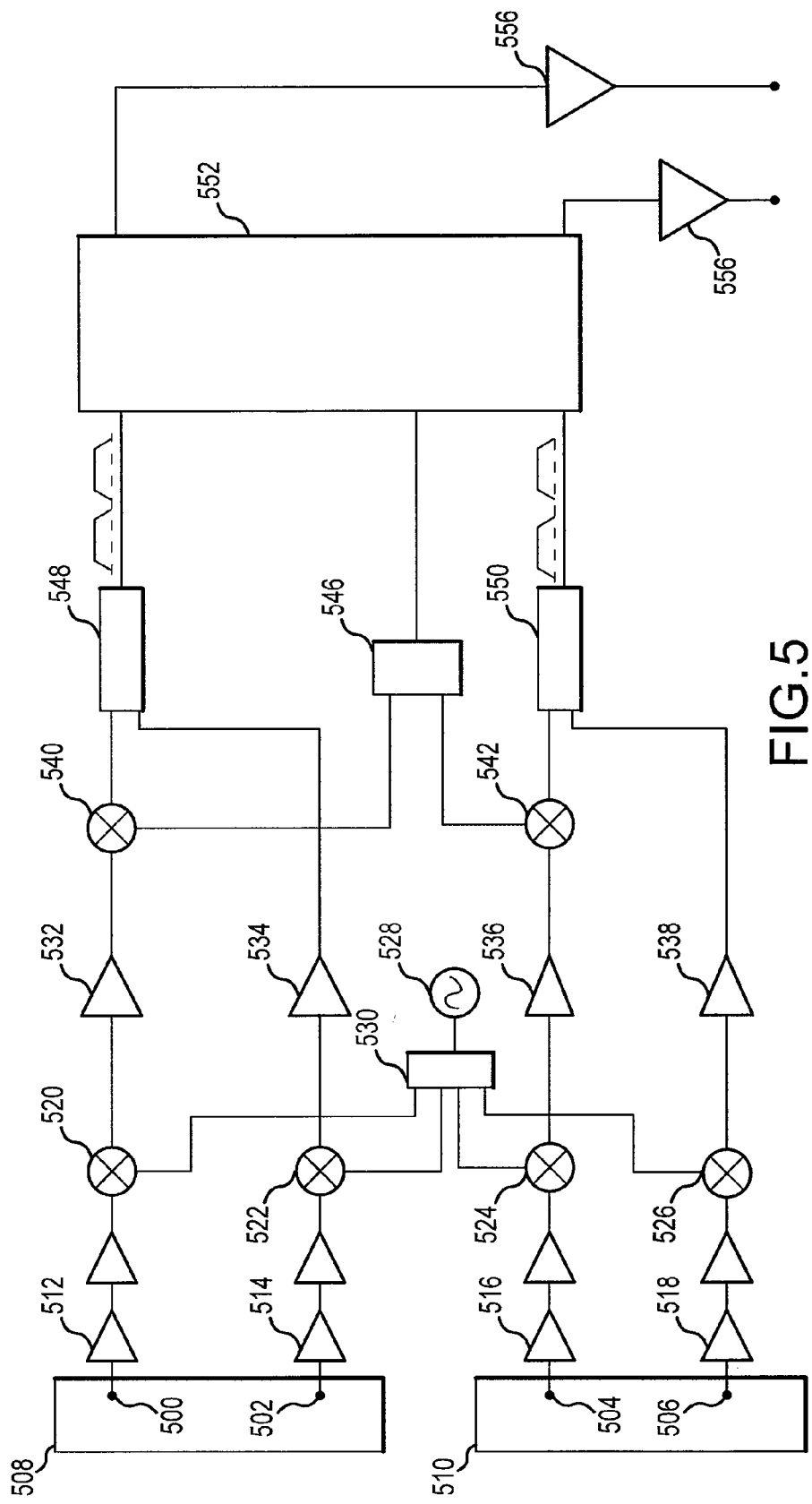
FIG. 5 is a first block diagram of a low noise block converter embodiment employing a band translating system incorporating a multiplexed signal to generate band stacked signals, in accordance with an embodiment.

FIG. 5 generally depicts a band-stacked LNB embodiment employing an alternate architecture having a single local oscillator instead of two local oscillators, as shown (for example) in the embodiment of FIG. 4. The embodiment accepts even and odd signals 500, 502, 504, 506 from a first and second satellite 508, 510. Each signal is fed into a distinct amplifier 512, 514, 516, 518 to generate an amplified signal. It should be noted that each satellite signal has a polarity and is received from a satellite at a particular position, as described above. One of each signal pair is a "low" signal and the other is designated the "high" signal. For example, in the signal pair from satellite 508, even signal 500 is the high signal and odd signal 502 is the low signal. It should be noted that the particular embodiment shown in FIG. 5 operates generally with a set top box having two tuners, one tuned to satellite 1's broadcast and one tuned to satellite 2's broadcast. (Alternatively, one tuner may function as a master and one as a slave as described above, and/or both tuners may be tuned to the same broadcast.) For simplicity's sake, the signal processing of the high and low signals 500, 502 from satellite 1 508 will be discussed. The same operations generally occur on the second satellite's signals 504, 506. A "high" signal may be, for example, a right-hand circular polarized signal and a "low" signal may be a left-hand circular polarized signal, or vice versa.

The high signal, once amplified by the amplifier, 512, is added to a reference signal by the signal mixer 520. In particular, the high signal is added to (e.g., band-translated with) an 11.25 GHz signal generated by the local oscillator 528, which may be either a phase-locked loop or digital resonance oscillator. The local oscillator 528 (LO) generates the 11.25 GHz signal which is then fed into a splitter 530. (The splitter 530 may also function to buffer the signal from the LO). As shown in FIG. 5, the split signal is transmitted from the splitter 530 to each mixer 520, 522, 524, 526 so that each of the received high and low signals may be band-translated with the 11.25 GHz signal, as generally described above. The output of the mixer 520, for example, is a band-translated signal having a frequency range generally of 950 to 1450 MHz. Thus, the absolute frequency of the satellite input signal ranges from 12.2 GHz to 12.7 GHz. It should be noted that both the low and high signals are mixed with the 11.25 GHz signal, unlike the operations of the embodiment shown generally in FIG. 4. Thus, after passing through mixer 520, the high signal's frequency ranges from 950 to 1450 MHz. Similarly, after being operated on by mixer 522, the low signal's frequency likewise ranges from 950-1450 MHz. These signals may be amplified by respective amplifiers 532, 534.

As may be appreciated, the low and high signals have approximately the same frequency ranges after the operations of the mixers 520, 522 and amplifiers 532, 534. Band-stacking the low and high signals at this point would result in degradation as the two signals would effectively overlie one another. Accordingly, the high signal, upon exiting amplifier 532, is band-translated with a 3.1 GHz signal by mixer 540 to yield a signal having a frequency between 1650 and 2150 MHz.

The 3.1 GHz signal is produced by the band translating circuit 552 and split (and, optionally, buffered) by splitter 546. The splitter 546 transmits the 3.1 GHz signal to the mixer 540, which in turn employs the 3.1 GHz signal to translate the high signal in a manner similar to that previously described with respect to FIGS. 2-4. The resulting high signal, having been translated twice, is band-stacked with the low signal by diplexer 548.

The output of diplexer 548 is a band-stacked signal ranging from 950 to 2150 MHz, combining two separate and unique signals, namely the low and high signals previously discussed. The high signal is spectrally inverted while the low signal remains non-inverted. The two signals are separated by a "guard band" of approximately 200 MHz: one signal ranges across a frequency band of 950 to 1450 MHz and the second, inverted signal ranges across a frequency band of 1650 to 2150 MHz. The separation of the two signals by the guard band, and the functions of the guard band, are generally discussed above. It should be noted that, in certain embodiments, the high band signal may not be spectrally inverted. Any of the embodiments discussed herein may employ a non-inverted high signal.

The same operations are generally performed on the low and high signals received from the second satellite 510 as are performed on the signals received from the first satellite 508.

Band translating circuit 552 accepts the band-stacked signals from combiners 548 and 550 and outputs a first and second stacked output 554, 556 as generally described above. Essentially, band translating circuit 552 operates in the same manner as the band translation block 402 of FIG. 4.

Figure 6:
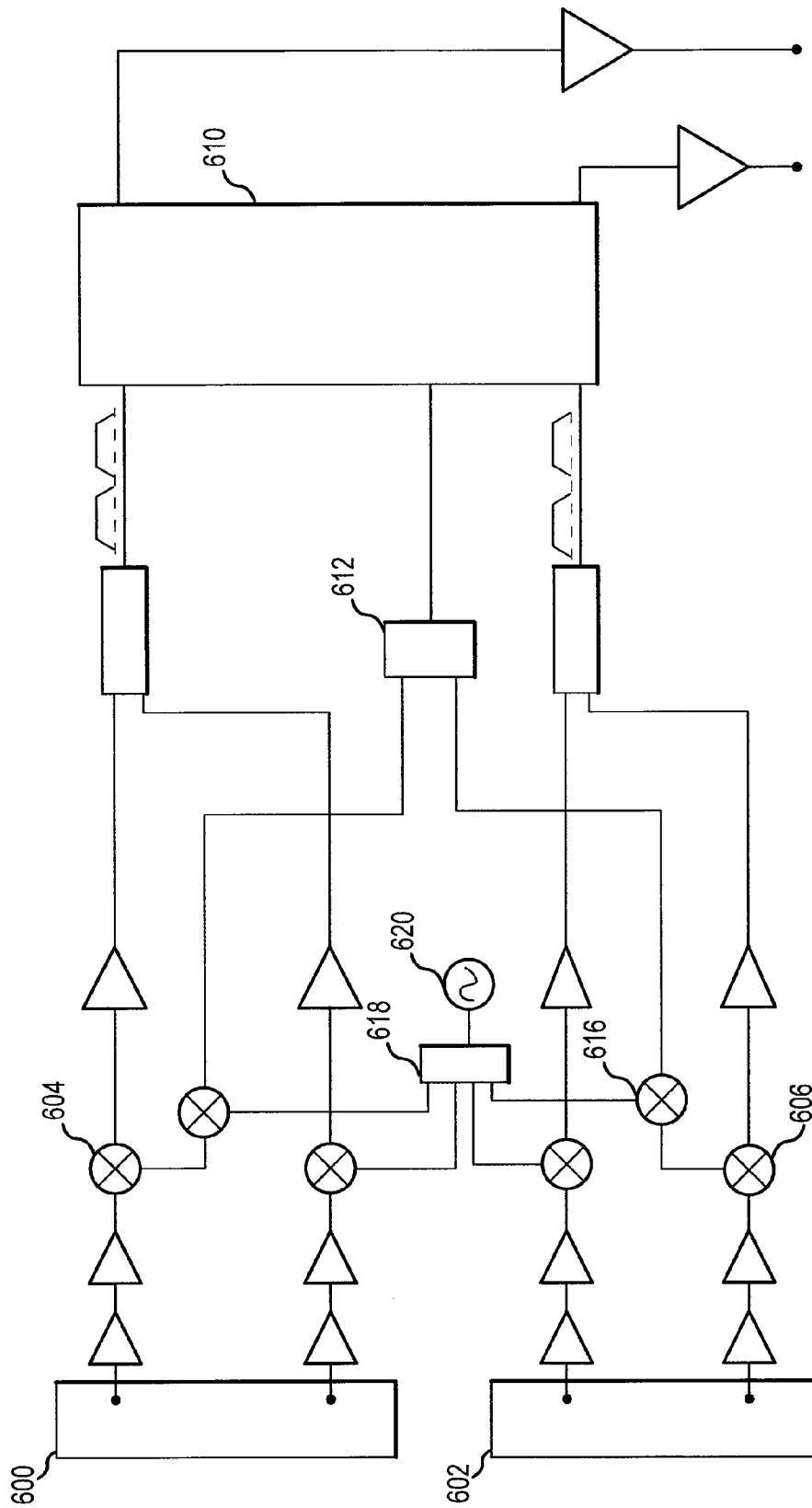
FIG. 6 is a second block diagram of a low noise block converter embodiment employing a band translating system incorporating a multiplexed signal to generate band stacked signals, in accordance with an embodiment.

FIG. 6 depicts another embodiment of a band-stacking LNBF. The embodiment of FIG. 6 operates in the same fashion as that of FIG. 5 with one difference. Instead of translating the high signal received from each satellite 600, 602 twice (for example, as shown in FIG. 5 with respect to first mixer 520 and second mixer 540), the high signal is translated only once by mixer 604. A 14.35 GHz signal is fed into mixer 604 (and, incidentally, mixer 606 for the high signal from the second satellite 602) for a single translation operation. The embodiment generates this 14.35 GHz signal by adding a 3.1 GHz reference signal to an 11.25 GHz reference signal. In particular, the band translating circuit 610 produces a 3.1 GHz signal (taken from the local oscillator of the circuit 610), which is split and, optionally, buffered by splitter 612. Splitter 612 transmits this signal to mixers 614 and 616.

Mixers 614 and 616 also receive an 11.25 GHz signal from a second splitter 618, which in turn receives the signal from local oscillator 620. The operation of local oscillator 620 and splitter 618 mirrors that of local oscillator 528 and splitter 530 of FIG. 5. Mixers 614 and 616 then add the two reference signals together to produce the 14.35 GHz output that is fed to mixers 604 and 606, and ultimately used to translate the high signals from each satellite.

Amplification, stacking and output of the exemplary LNBF of FIG. 6 is otherwise the same as the embodiment of FIG. 5.

Figure 7:
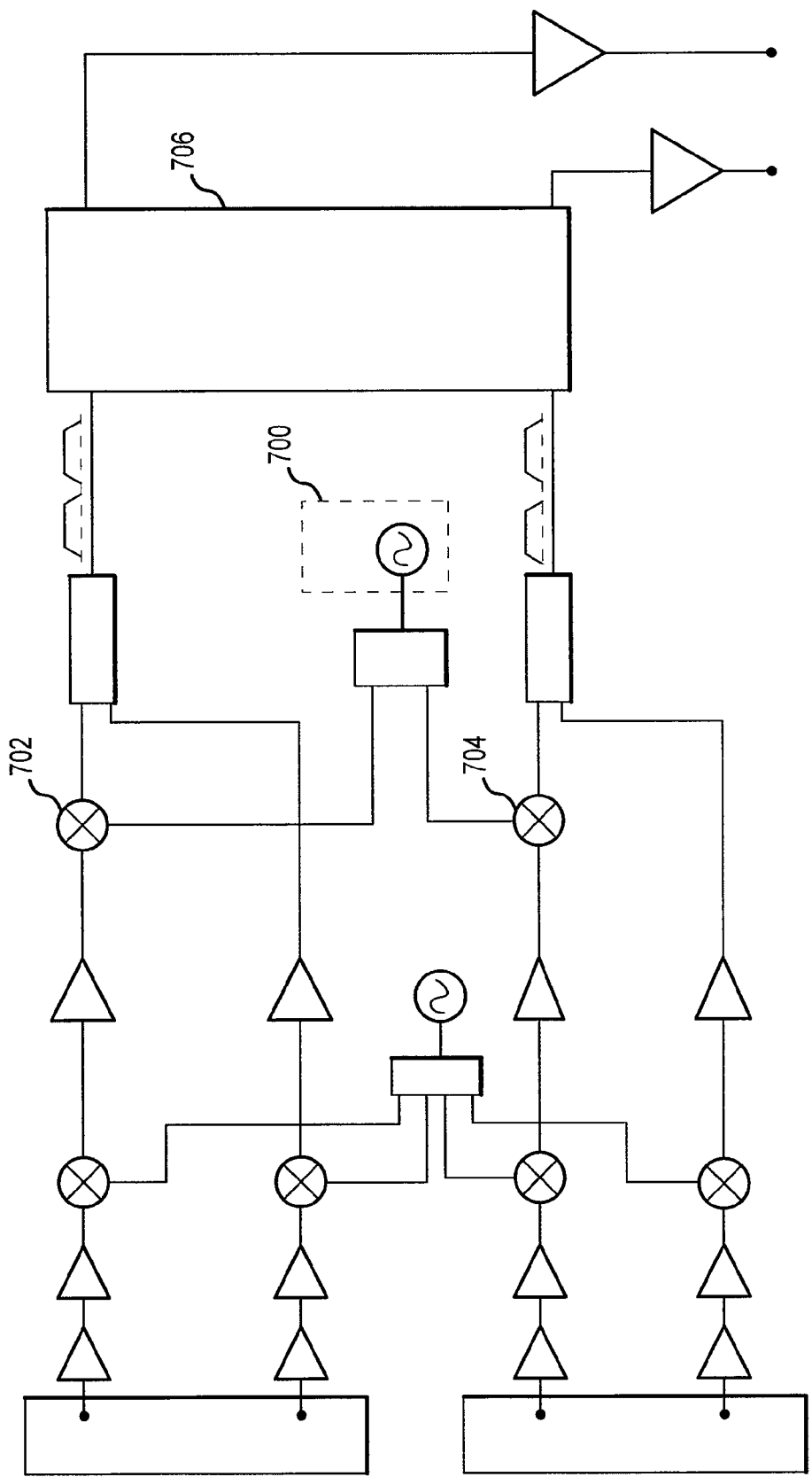
FIG. 7 is a third block diagram of a low noise block converter embodiment employing a band translating system incorporating a multiplexed signal to generate band stacked signals, in accordance with an embodiment.

FIG. 7 depicts yet another embodiment of an LNBF. In general, the embodiment of FIG. 7 operates in the same manner as the embodiment of FIG. 5, except that the 3.1 GHz signal used by mixers 702, 704 is generated by a dedicated local oscillator 700 instead of being pulled from band translating circuit 706. In all other respects, the operation is identical.

Figure 8:
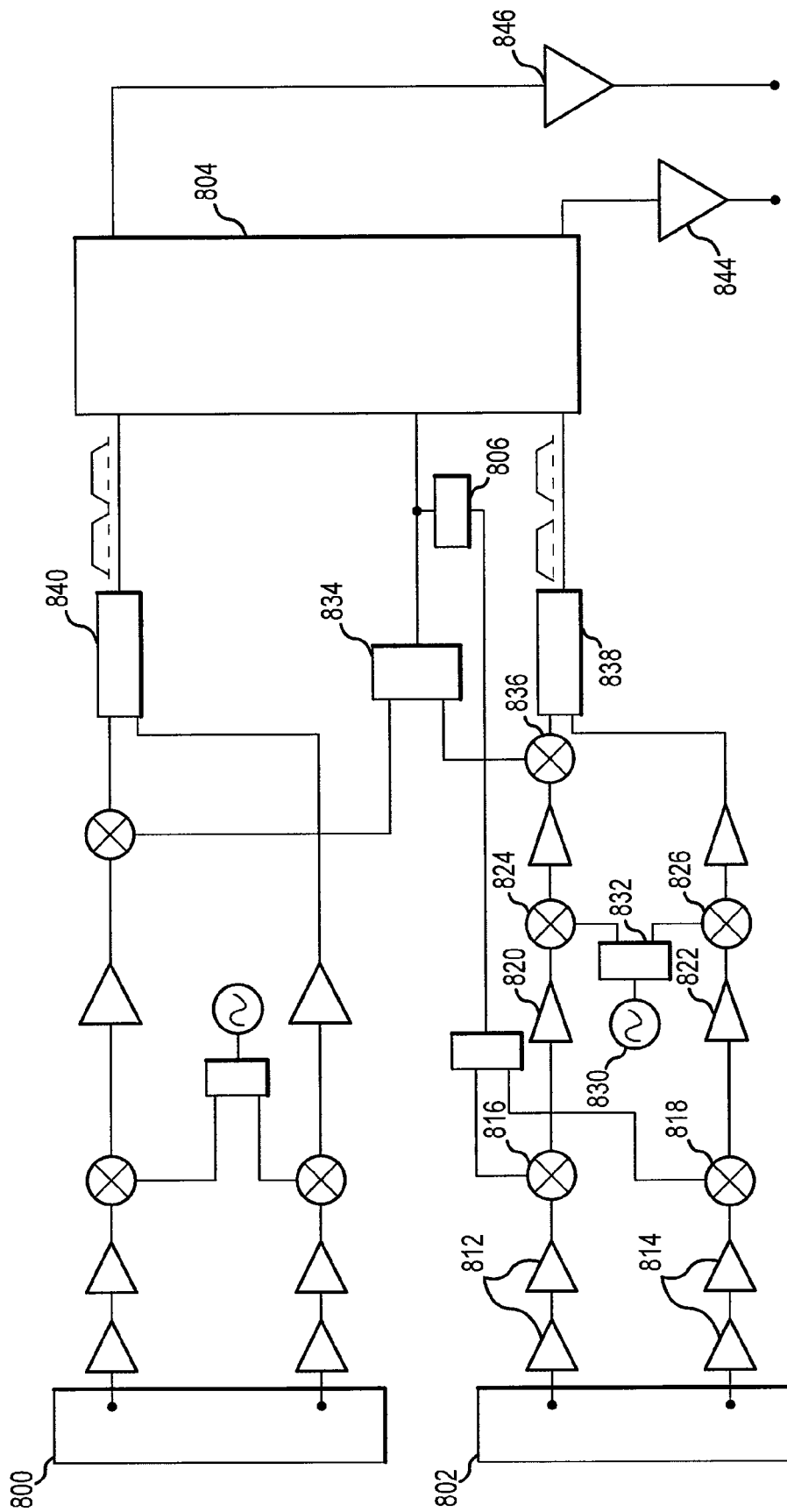
FIG. 8 is a fourth block diagram of a low noise block converter embodiment employing a band translating system incorporating a multiplexed signal to generate band stacked signals, in accordance with an embodiment.

FIG. 8 depicts still another embodiment of an LNBF. Again, the embodiment accepts signal pairs from a first satellite 800 and a second satellite 802. The embodiment performs the same operations on the signals from the first satellite 800 as described previously with respect to FIG. 5. The signals from the second satellite 802, however, are processed somewhat differently.

Initially, both the high and low signals are amplified by amplifiers 812 and 814. Next both the high and low signals are mixed with a 6.2 GHz reference signal by mixers 816, 818. The 6.2 GHz signal is produced by doubling, via a doubler 806, the 3.1 GHz signal intrinsic to the band translating circuit 804. The resulting signals are again amplified (by amplifiers 820 and 822, respectively) before being fed into yet more mixers 824, 826. Mixers 824, 826 add the high and low signals to a 10.15 GHz signal outputted by a local oscillator 830. The local oscillator 830 transmits the 10.15 GHz reference signal to a splitter 832, which splits it and feeds the split signal to both of the mixers 824, 826.

The low signal exits mixer 826 and is transmitted to the diplexer 838. The high signal, however, is transmitted from mixer 824 to mixer 836. Mixer 836 translates the high signal with a 3.1 GHz reference signal outputted by splitter 834. Translation has been previously described in this document. Once translated, the high signal is also fed to diplexer 838. The diplexer 838 band stacks the high and low signals of the second satellite 802 in the manner previously described. Likewise, diplexer 840 band stacks the high and low signals of the first satellite 800.

The band translating circuit accepts band-stacked signals from the diplexers 838, 840 and translates them, in the manner previously described, to produce stacked outputs 844, 846. These stacked outputs 844, 846 are similar to those of prior figures.

Figure 9:
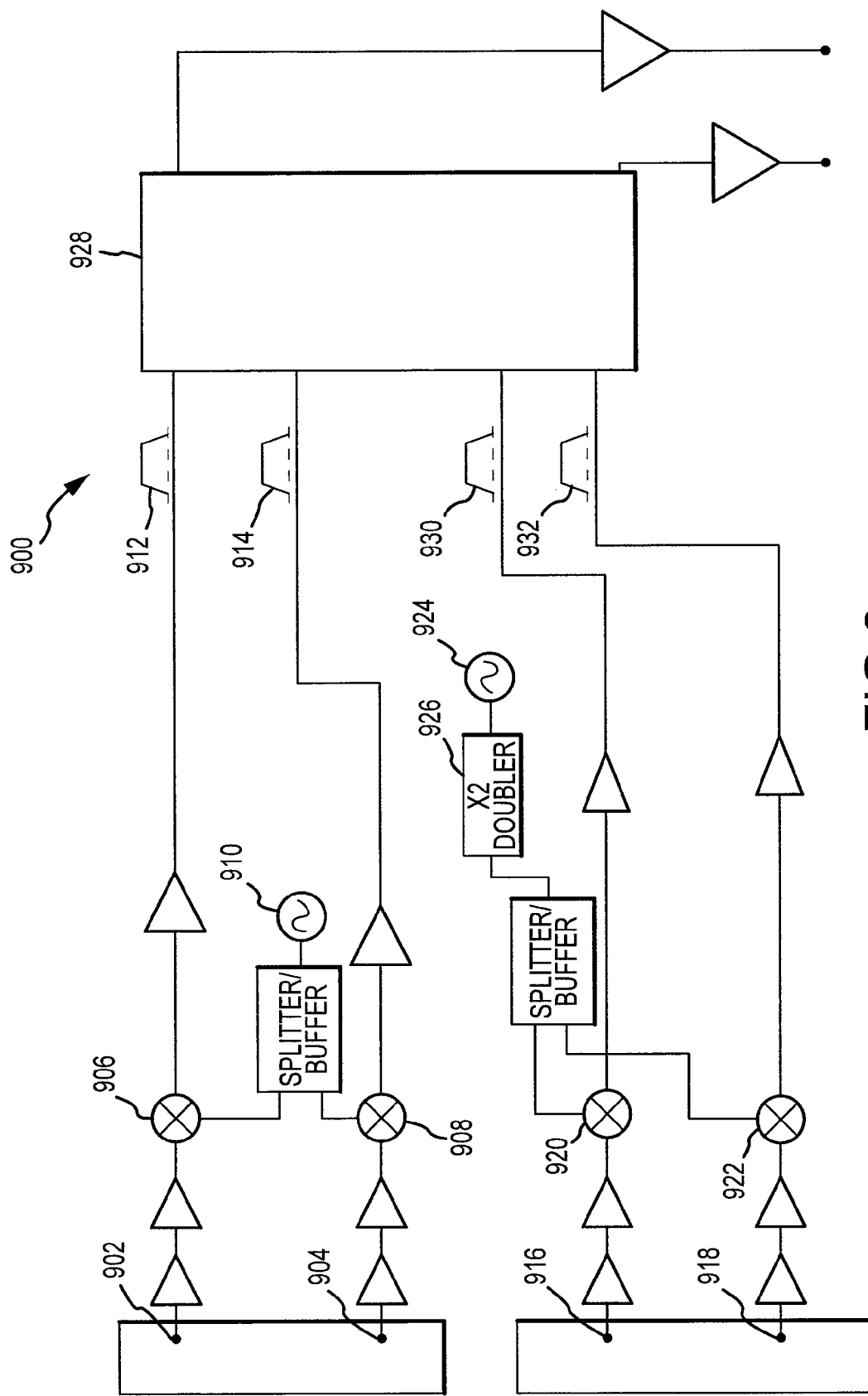
FIG. 9 is a fifth block diagram of a low noise block converter embodiment employing a band translating system incorporating a multiplexed signal to generate band stacked signals, in accordance with an embodiment.

FIG. 9 depicts a band translating embodiment 900 employing non-stacked inputs. Generally, the embodiment receives a first high signal and first low signal. Each of the first high signal 902 and first low signal 904 are mixed with an 11.25 GHz reference signal by first and second mixers 906, 908, respectively. The 11.25 GHz reference signal may be generated, for example, by a local oscillator or dielectric resonator oscillator 910.

The outputs of the first and second mixers 912, 914 may optionally be amplified and take the form of first and second non-stacked signals. Both of the first and second non-stacked signals occupy a frequency band of approximately 950-1450 MHz.

Similarly, the embodiment of FIG. 9 may also receive a second high signal 916 and second low signal 918. The second high and low signals may be, for example, 17 GHz signals having a right-hand and left-hand polarity, respectively. (In some embodiments, the polarities may be reversed.) The second high and low signals may be mixed with a 16.35 GHz reference signal by third and fourth mixers 920, 922, respectively, to produce third and fourth non-stacked signals 930, 932, each within a 950-1450 MHz frequency band.

The 16.35 GHz reference signal may be generated in the present embodiment by doubling the output of a 8.175 GHz oscillator 924 via a doubler 926.

A band translating circuit 928 accepts the first, second, third and fourth non-stacked signals 912, 914, 930, 932 and operates generally as described above to produce two stacked outputs. Accordingly, it should be understood that certain embodiments may translate signals without band stacking the signals.

Although the present invention has been described with respect to particular embodiments, apparatuses and processes, it should be understood that these are illustrative rather than limiting. Variations on the embodiments, apparatuses and processes described herein may be created without departing from the spirit or scope of the invention. Further, it should be noted that all frequencies and signals discussed herein are provided by way of example and not limitation. Alternative embodiments may vary frequencies or any other signal characteristic as necessary or desired. It should also be noted that frequency mixing and/or frequency translating, as described herein, are examples of band translating in accordance with this disclosure.

I claim:

1. A low noise block converter feedhorn, comprising:
   a signal receiver operative to receive at least a first input signal and a second input signal;
   an oscillator operative to generate a first reference signal;
   a first mixer operative to receive the first input signal from the signal receiver, further operative to mix the first input signal with the first reference signal to create a first translated signal;
   a second mixer operative to receive the second input signal from the signal receiver, further operative to mix the second input signal with the first reference signal to create a second translated signal;
   a band translating circuit operative to at least generate a second reference signal;
   a third mixer operative to mix the first translated signal with the second reference signal to create a third translated signal;
   a first combiner operative to stack the third translated signal and second translated signal into a first single stacked signal; and
   the band translating circuit connected to an output of the first combiner, the band translating circuit further operative to receive the first single stacked signal from the first combiner and to create at least a first stacked output.

2. The low noise block converter feedhorn of claim 1, further comprising:
   a second signal receiver operative to receive at least a third input signal and a fourth input signal;
   a fourth mixer operative to receive the third input signal from the second signal receiver, further operative to mix the third input signal with the first reference signal to create a fourth translated signal;
a fifth mixer operative to receive the fourth input signal from the second signal receiver, further operative to mix the fourth input signal with the first reference signal to create a fifth translated signal;
a sixth mixer operative to mix the fourth translated signal with the second reference signal to create a sixth translated signal; and
a second combiner operative to stack the fifth translated signal and sixth translated signal into a second single stacked signal.

3. The low noise block converter feedhorn of claim 2, wherein:
the band translating circuit connected to an output of the second combiner, the band translating circuit further operative to receive the second single stacked signal from the second combiner and to create a second stacked output.

4. A method for converting at least a first incoming transmission and a second incoming transmission to an outgoing transmission, comprising:
receiving a first incoming transmission;
receiving a second incoming transmission;
generating a first and second reference signal from an oscillator;
multiplexing the first incoming transmission with the first reference signal to create a first multiplexed signal;
multiplexing the second incoming transmission with the second reference signal to create a second multiplexed signal;
generating a third reference signal from a band translating circuit;
multiplexing the second multiplexed signal with the third reference signal to create a third multiplexed signal;
diplexing the second and third multiplexed signals to create a first band-stacked signal; and
receiving the first band-stacked signal as input to the band translating circuit.

5. The method of claim 4, wherein the first and second reference signals are identical.

6. The method of claim 5, wherein the operation of generating a first and second reference signal from an oscillator comprises:
generating a base signal from the oscillator; and
splitting the base signal to create the first and second reference signals.

7. The method of claim 4, further comprising:
receiving a third incoming transmission;
receiving a fourth incoming transmission;
generating a fourth and fifth reference signal from the oscillator;
multiplexing the third incoming transmission with the fourth reference signal to create a fourth multiplexed signal;
multiplexing the fourth incoming transmission with the fifth reference signal to create a fifth multiplexed signal;
generating a sixth reference signal from the band translating circuit;
multiplexing the fourth multiplexed signal with the sixth reference signal to create a sixth multiplexed signal;
diplexing the fifth and sixth multiplexed signals to create a second band-stacked signal;
receiving the second band-stacked signal as input to the band translating circuit and
translating the first and second band-stacked signals.

8. The method of claim 7, wherein the first, second, fourth and fifth reference signals are identical.

9. The method of claim 8, wherein the third and sixth reference signals are identical.

10. An apparatus for converting at least one right-hand polarized signal and at least one left-hand polarized signal into a stacked output, comprising:
a first signal receiver for receiving a first right-hand polarized signal and a first left-hand polarized signal;
a first oscillator operative to generate a first base signal;
a doubler electrically connected to the oscillator and operative to double the first base signal, thereby producing a doubled base signal;
a first splitter operatively connected to the doubler and operative to split the doubled base signal into a first reference signal and a second reference signal;
a first multiplexer electrically connected to the first oscillator via the double and the first splitter and connected to the first signal receiver;
a second multiplexer electrically connected to the first oscillator via the double and the first splitter and connected to the first signal receiver; and
a band translating circuit electrically connected to the first and second multiplexers, the band translating circuit outputting at least a first stacked output.

11. The apparatus of claim 10, wherein:
the first multiplexer is operative to accept the first reference signal from the splitter and multiplex the first reference signal with the left-hand polarized signal.

12. The apparatus of claim 11, wherein:
the second multiplexer is operative to accept the second reference signal from the splitter and multiplex the first reference signal with the right-hand polarized signal.

13. The apparatus of claim 10, further comprising:
a second signal receiver for receiving a second left-hand polarized signal and a second right-hand polarized signal;
a second signal generator operative to generate a second reference signal and a third reference signal;
a second oscillator operative to generate a second base signal;
a second splitter operatively connected to the second oscillator and operative to split the second base signal into a third reference signal and a fourth reference signal;
a third multiplexer electrically connected to the second oscillator via the second splitter and connected to the second signal receiver, the third multiplexer operative to multiplex the third reference signal with the second left-hand polarized signal; and
a fourth multiplexer electrically connected to the second oscillator via the second splitter and connected to the second signal receiver, the fourth multiplexer operative to multiplex the fourth reference signal with the second right-hand polarized signal; wherein
the band translating circuit is further electrically connected to the third and fourth multiplexers, the band translating circuit outputting at least a second stacked output.

14. The apparatus of claim 10, wherein the first base signal comprises an 8.175 GHz signal.

15. The apparatus of claim 14, wherein:
the first reference signal comprises a 16.35 GHz signal; and
the second reference signal comprises a 16.35 GHz signal.

* * * * *